United States Patent Office 3,246,733
Patented Apr. 19, 1966

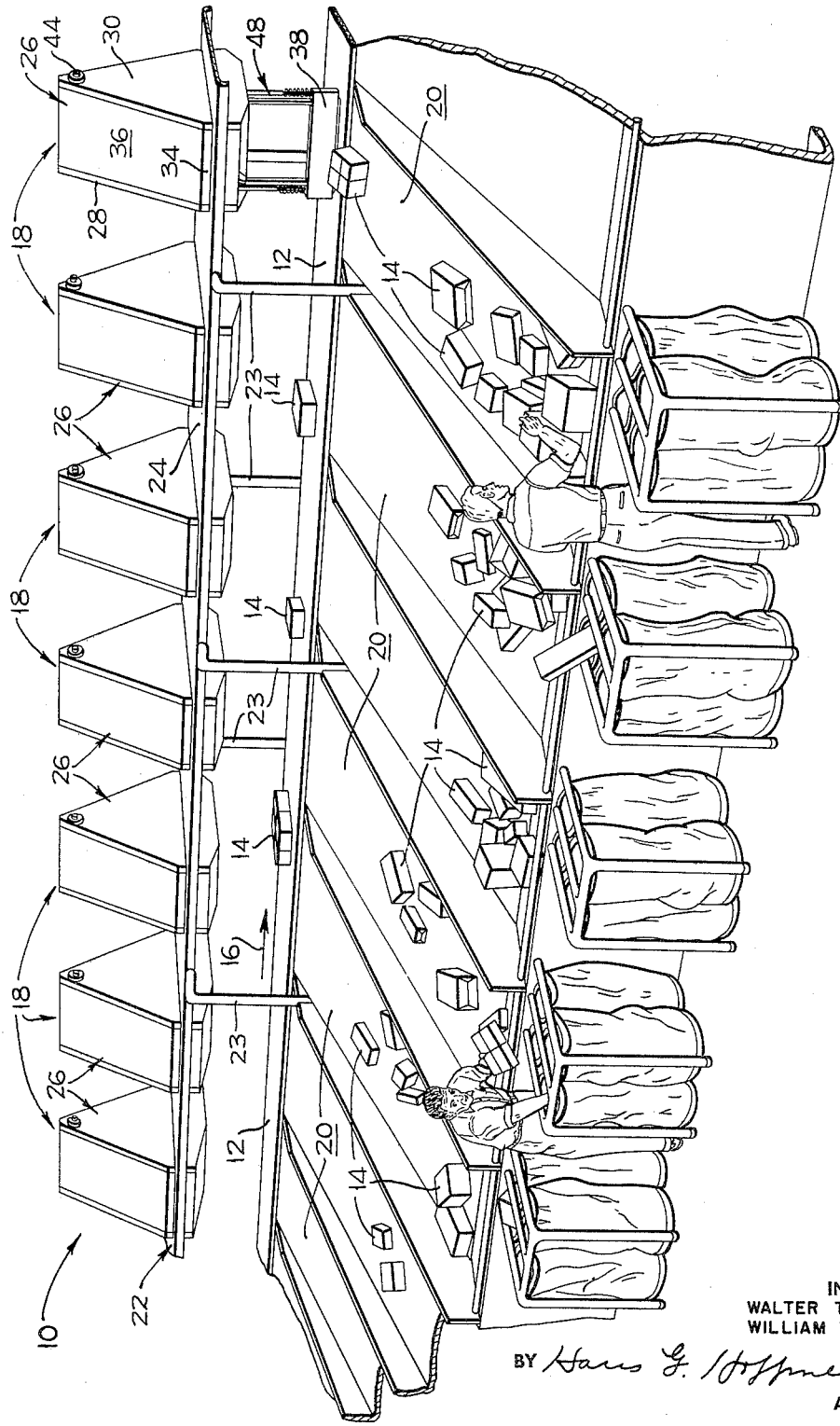

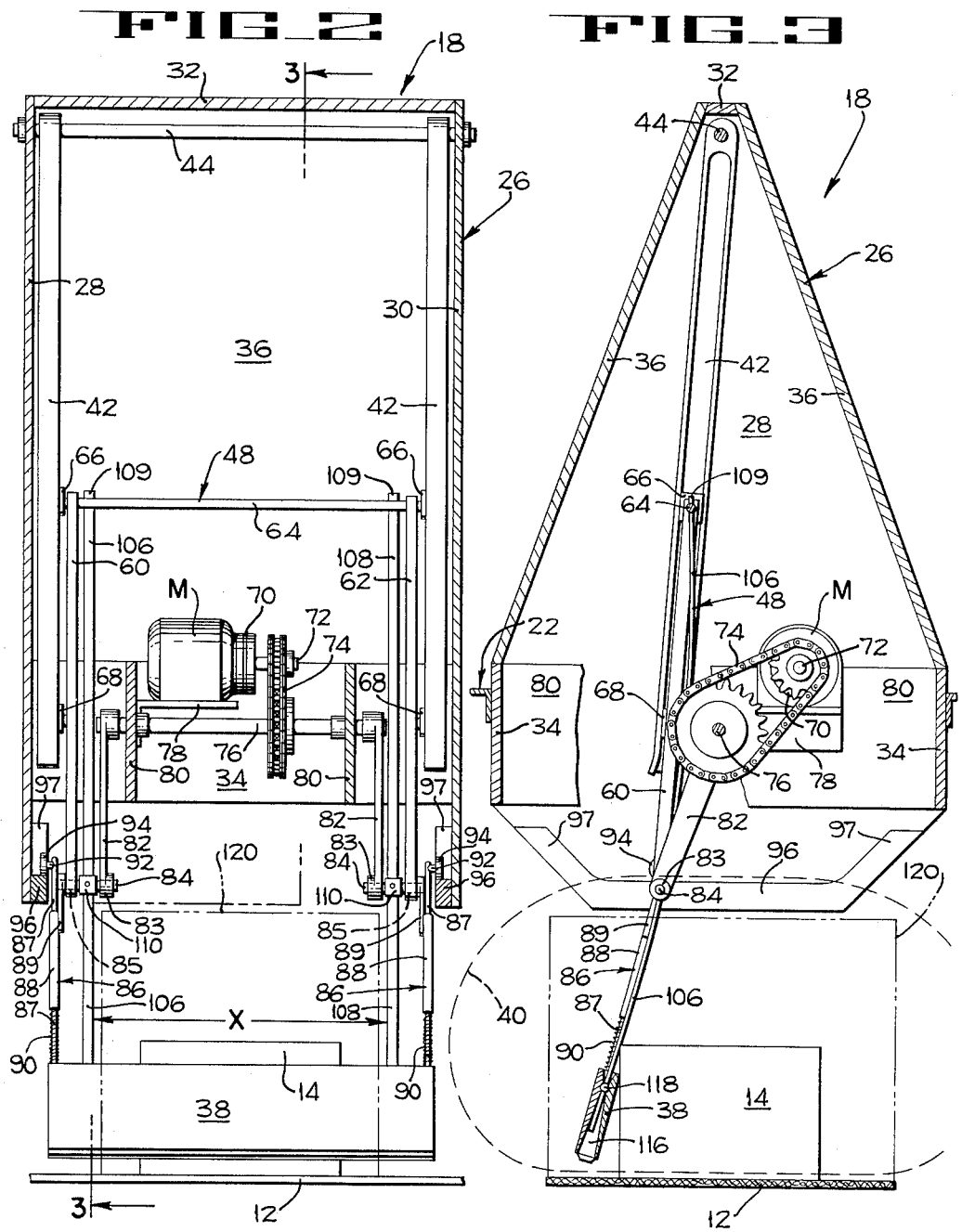

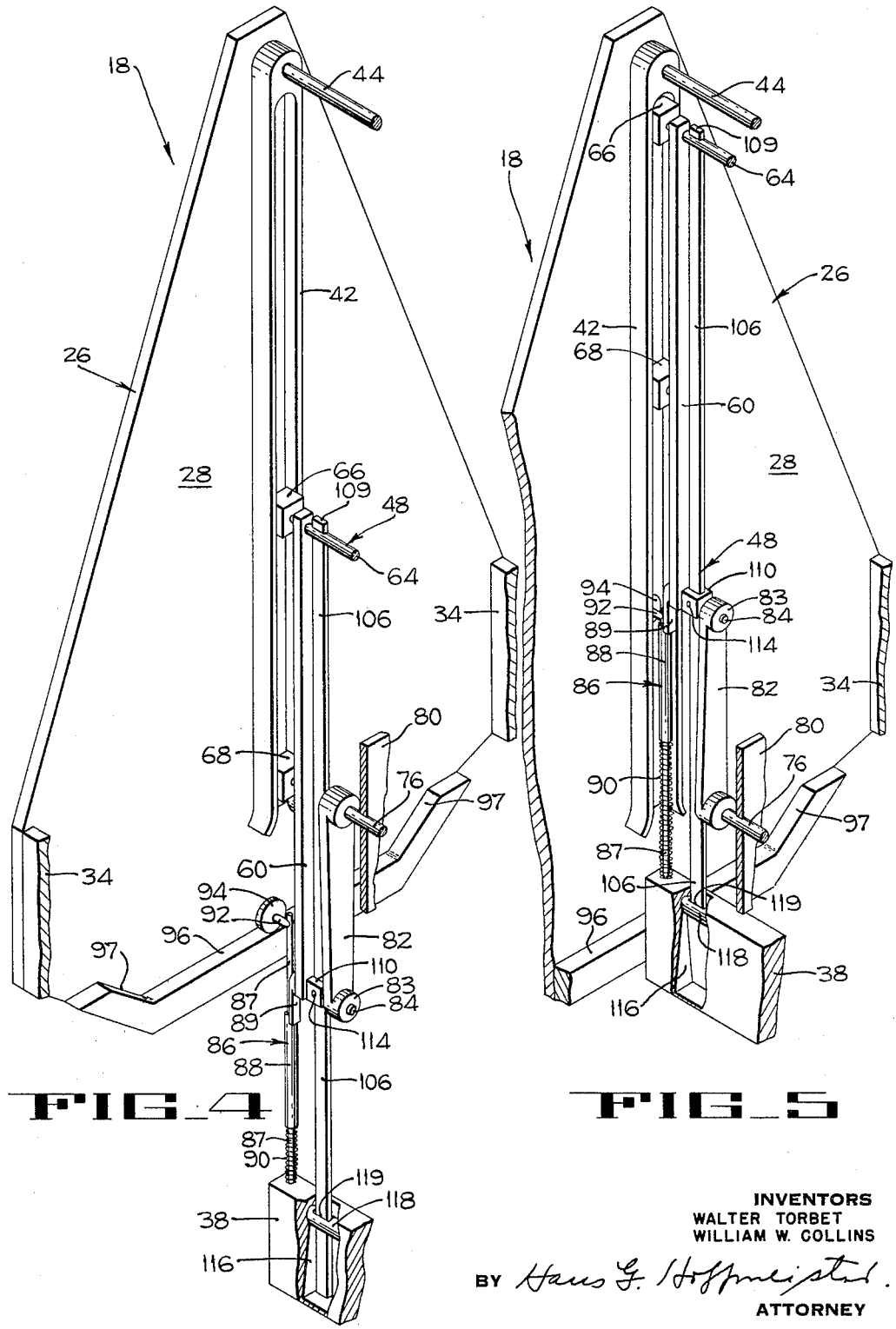

3,246,733
ARTICLE HANDLING MECHANISM
Walter Torbet, Santa Clara, and William W. Collins, San Jose, Calif., assignors to FMC Corporation, San Jose, Calif., a corporation of Delaware
Filed Aug. 22, 1962, Ser. No. 218,779
12 Claims. (Cl. 198—185)

The present invention pertains to an article handling or diverting mechanism and more particularly, relates to an apparatus for laterally diverting random size articles from a conveyor.

In the particular embodiment of the invention to be herein described, the article diverting mechanism is utilized to divert parcels from a moving conveyor in a Post Office parcel sorting installation. An article diverting mechanism in accordance with the present invention is provided above the conveyor adjacent laterally aligned discharge chutes at both sides of the conveyor, and operates to push the parcels from the conveyor into any selected discharge chute.

One requirement of a diverting mechanism for the described purpose is that the parcels must be gently handled because some parcels contain fragile articles, and because many of the parcels are flimsy, and are thus easily damaged. In addition to the requirements of rapid operation, durability, and compactness, the diverting mechanism must also be capable of handling a wide variety of parcel sizes and weights.

Accordingly, one of the objects of the present invention is to provide an improved bi-directional article diverting mechanism which is capable of handling a wide range of article sizes.

Another object of this invention is to provide an article diverter for rapidly pushing parcels from a support surface, and in which the pusher is resiliently mounted so as to cushion the initial shock of the pusher contacting and accelerating the parcel whereby the parcels and their contents are protected from damage or breakage.

Another object is to provide an improved article diverting mechanism so constructed and arranged as to minimize the space required for the diverter.

A further object is to provide an improved article diverting mechanism in which a swinging pusher blade sweeps articles such as parcels from a support surface, and in which the pusher blade suspension means is so designed as to minimize the impact of the pusher blade against the parcel.

Other objects and advantages of the present invention will become apparent from the following specification and drawings illustrating one embodiment of the invention, and wherein:

FIGURE 1 is a fragmentary perspective of a parcel sorting system in which a plurality of article diverting mechanisms of the present invention are mounted over a parcel conveyor to divert selected parcels into selected lateral discharge chutes.

FIGURE 2 is a schematic, substantially central vertical section through one of the parcel diverting mechanisms shown in FIGURE 1, and is taken looking in an upstream direction.

FIGURE 3 is a schematic vertical section taken on a plane at a position represented by line 3—3 of FIGURE 2.

FIGURES 4 and 5 are schematic fragmentary perspectives illustrating the upstream portion of a pusher blade, its carriage and associated structure, and respectively illustrate the pusher blade and carriage in a lowered, parcel diverting position and in a raised, idle position.

A detailed description of the parcel sorting system in which the article diverter mechanism of the present invention is used is disclosed in the pending patent application of Collins et al., Serial No. 190,889, filed April 30, 1962, and assigned to the assignee of the present invention.

In brief, the overall parcel sorting system 10 (FIG. 1) includes a parcel conveyor belt 12 which conveys a lane of spaced, random size parcels 14 in the direction of the arrow 16 under a series of identical article diverting mechanisms 18. At an upstream coding station not shown, the address on each parcel is read by an operator to determine the location at which it will eventually be discharged from the conveyor belt 12. This information is relayed by the operator to a memory system, not shown, which in effect retains such information until the parcel arrives at its discharge location opposite to the appropriate one of a plurality of discharge chutes 20, at which time the memory system causes energization of the adjacent article diverting mechanism 18 and the parcel is pushed by the diverting mechanism laterally from the parcel conveyor belt 12 into the desired discharge chute. Operators attending the chutes gather and separately sack the parcels delivered by each chute.

Discharge chutes, not shown, which are aligned with the chutes 20, extend from the opposite side of the belt conveyor 12, and each article diverting mechanism 18 is operable to divert parcels to either side of the conveyor belt 12, according to the directional signal emanating from the memory control system, not shown. The memory control system and associated apparatus disclosed in the above-identified Collins patent application for actuating the article diverting mechanisms 18 forms no part of the present invention, which is directed solely to the article diverting mechanism since any of a variety of conventional control means may be utilized.

More specifically, and with continued reference to FIGURE 1, the article diverting mechanisms 18 are supported by a rigid superstructure 22 comprising supporting legs 23 and a platform 24 extending longitudinally over the conveyor belt 12. Each diverting mechanism 18 includes a housing 26 that is secured to the platform 24. The housing 26 (FIGS. 2 and 3) includes spaced, generally pear-shaped end walls 28 and 30 which extend across the conveyor belt 12 and are rigidly interconnected by a top plate 32 near their upper ends, and by longitudinal frame plates 34 at their points of maximum width. The housing 26 also has lateral walls 36 in inverted V-shaped relation and which may be sheet metal since they require little structural strength and serve merely to enclose the mechanism.

A pusher blade 38 is normally positioned above and within the lower end of the housing 26 and is movable, in a parcel diverting operational cycle or orbital path, downward from the housing and across the conveyor belt 12 in a selected direction to sweep the adjacent parcel 14 laterally from the belt into the corresponding discharge chute 20. The orbital path of the lower edge of the blade is indicated by the dashed line 40 (FIG. 3).

For mounting the pusher blade 38, the subject mechanism includes a pair of inwardly opening guide channel tracks 42 (FIGS. 2 and 3), each of which is positioned adjacent to the inner surface of one of the end walls 28 and 30, and the upper ends of which are pivotally mounted for swinging movement about a common pivot axis on a pivot shaft 44 that is supported by the end walls 28 and 30. A carriage 48 is provided for supporting the pusher blade 38 as it sweeps along the path 40 (FIG. 3), the carriage being slidably connected to the guide tracks 42 for sliding movement relative to the tracks in a direction toward and away from the conveyor belt 12 while the guide tracks 42 swing about their common pivot shaft 44.

The carriage 48 (FIGS. 2–5) includes transversely aligned arms 60 and 62 which are interconnected by a horizontal shaft 64 that projects through both arms and is provided with a guide block 66 on each end. The guide blocks 66 are slidably disposed within their respective channels of the guide tracks 42. A similar guide block 68 is mounted on the outer surface of each arm 60 and 62 intermediate its ends and is also slidably mounted in the adjacent guide track. In this manner the arms 60 and 62 of the carriage are maintained parallel to the guide tracks during sliding movement in the guide tracks 42 toward and away from the pivot shaft 44 while simultaneously swinging with the guide tracks about the axis of the pivot shaft. Alternatively, the guide tracks 42 may be formed of rods, in which case the guide blocks 66 and 68 must be provided with apertures so that they are slidable upon the guide track rods. It is evident, therefore, that the guide tracks and carriage constitute a telescopic mounting linkage for the pusher blade.

Such sliding and swinging movement of the carriage arms 60 and 62 and swinging movement of the guide tracks 42 (FIGS. 2 and 3) is imparted by a reversible electric gearhead motor M having associated internal limit switches in a housing 70. The output shaft 72 of motor M is connected by a chain and sprocket drive unit 74 to a driveshaft 76. Motor M is supported by a bracket 78 that is secured to one of two spaced plates 80 that interconnect the frame plates 34. The end portions of the driveshaft 76 project through the plates 80 and are fixed to a pair of aligned crank levers 82. Each crank lever has a free end 83 that embraces an associated, non-rotatable crank pin 84 which has an opposite end portion 85 (FIG. 2) projecting through the lower end portion of the adjacent carriage arm 60 or 62. When motor M is energized, its internal limit switches are effective to maintain the motor energized only so long as to cause a single revolution of the driveshaft 76. Accordingly, when motor M is energized, the free ends of the crank levers 82 are carried from the initial top dead center position shown in FIGURE 5 for one revolution about the axis of the driveshaft 76.

Since motor M is reversible, such movement of the crank levers 82 is effected in either direction as is governed by the particular control means employed to energize the motor. The guide tracks 42 will thus be caused to pivot about the axis of the shaft 44 and the carriage 48 will extend toward, across, and then retract from the conveyor belt 12 as the crank pins 84 follow a circular path about the axis of the driveshaft 76.

Each end of the pusher blade 38 is operatively connected to the carriage arms 60 and 62 by a telescopic radius arm 86 that includes a rigid inner shaft 87 over which a sleeve 88 is slidably mounted. The lower end of the shaft 87 is secured to the pusher blade 38. The sleeve 88 is provided with an integral inner arm 89 which has an upper bearing portion that is mounted on the crank pin 84 so that movement of the adjacent carriage arm 60 or 62 effects positive movement of the sleeve 88. The inner shaft 87 is urged downward in the sleeve 88 by a compression spring 90 which is mounted on the shaft and is positioned between the upper edge of the pusher blade 38 and the lower end of the sleeve 88.

Downward movement of the shaft 87 in the sleeve 88 is limited by means of a lateral shaft 92 integral with the upper end portion of the shaft, and which is adapted to abut the upper end of sleeve 88. The shaft 92 carries a cam follower roller 94 which lies in a vertical plane coincident with a fixed camming strip 96. Both camming strips 96 are identical and are secured to the lower end portions of their associated end walls 28 or 30 in positions in which the cam follower rollers 94 ride over their upper surfaces when the crank levers 82 swing the carriage 48 toward the conveyor belt 12.

When the crank levers 82 descend from their initially upright positions, the cam follower rollers 94 contact one of the upwardly sloping end portions 97 of the camming strip 96 (according to the direction in which the diverting operation is to occur), and the rollers 94 are thereupon guided onto the central, linear portions of the camming strips. With the cam rollers riding on the strips, further downward movement of the pusher blade is precluded. Thus, the cam rollers are in effect lifted with respect to the crank pins 84; likewise the radius shafts 87 which carry the cam follower rollers are lifted relatively to the sleeves 88. Thus the pusher blade 38 is also lifted from its otherwise elliptical path, and the lower edge of the pusher blade moves across the linear lower portion of the previously mentioned pusher blade path 40 (FIG. 3). The above described lifting of the pusher blade 38 relative to the carriage 48 (FIGS. 4 and 5) is thus accommodated by the telescopic construction of the radius arms 86, while at the same time the springs 90 urge the pusher blade toward the conveyor belt 12 so that the cam follower rollers 94 maintain contact with the camming surfaces of the camming strips 96.

When the cam follower rollers 94 disengage their associated camming strips, the springs 90 cause the shafts 87 to slide downward through the sleeves 88 until the cam follower shafts 92 abut the upper ends of the sleeves and limit downward movement of the shafts 87 relative to the carriage 48.

A resilient mounting of the pusher blade 38 to the carriage 48 is provided by two, spaced, spring-steel arms 106 and 108 (FIGS. 2, 4 and 5) which are respectively associated with the carriage arms 60 and 62. The arms 106 and 108 are capable of substantial flexing in either direction of pusher blade movement across the conveyor belt 12 and each have an upper end portion 109 (FIGS. 2 and 4) which lies in an aligned slot in the carriage shaft 64. The intermediate portion of each spring arm extends through an apertured block 110 that forms the central portion of each of the crank pins 84. A pin 114 locks each spring arm to its associated crank pin block 110, and the lower end portions of the spring arms are loosely received in apertures 116 (FIG. 4) that extend through the pusher blade in the plane thereof.

As shown in FIGURE 3, the apertures 116 are generally keyhole shape in cross section, whereby a limited amount of rocking movement of the pusher blade 38 on the spring arms is accommodated. A horizontal pivot pin 118 is mounted in the pusher blade at the narrow portion of each keyhole aperture and provides a slot 119 that slidably receives the associated spring arm so as to maintain the arm centered in the aperture 116 but to permit up and down relative movement of the arms 106, 108 and the pusher blade 38 when the radius arm shafts 87 slide in the tubular sleeves 88 in the manner previously described.

The spring arms 106 and 108 and their operative association with the carriage 48 form one of the important features of the present invention whereby the impact of the pusher blade 38 against a parcel is minimized. In other words, the spring arms provide a shock absorbing link between the carriage 48 and the pusher blade 38, the effect of which is to absorb not only part of the impact of the blade against the parcel, but to also absorb part of the initial accelerating force as the parcel is pushed aside by the blade.

The spring arms when they are not flexed, also maintain parallelism of the telescopic radius arms 86 with the carriage arms 60 and 62 when the pusher blade 38 has completed a parcel diverting operation and is moving toward the upper sector of the blade path 40 (FIG. 3). It is important that the parallel condition of the carriage and radius arms is maintained when the pusher blade is rising because the cam follower rollers 94 (FIG. 2) lie in vertical planes intersecting the open channels of the guide tracks 42. Accordingly, when the crank levers 82 (FIG. 5) move toward their upright positions, the upper ends of the tubular sleeves 88 engage the cam follower shafts 92 and the rollers 94 enter the channels of the guide tracks 42. By virtue of this construction, the distance between the end walls 28 and 30 is less than would be required if the guide tracks 42 and the cam rollers 94 had separate vertical planes of movement. If the previously-mentioned alternative construction of rods are used for the guide tracks 42, it will be evident that the cam rollers 94 must be offset so as not to interfere with the rods.

In operation, each article diverter unit 18 (FIG. 1) is initially in a position wherein its crank levers 82 (FIG. 5) are extending vertically upward, from the driveshaft 76, and the lower edge of the pusher blade 38, therefore, lies above the lower edge of the end walls 28 and 30 (FIGS. 2 and 3). The maximum parcel height or thickness, as indicated by the phantom outline 120, can thus be very near the total clearance between the conveyor belt 12 and the lower edges of the walls 28 and 30. At the same time, the diverting mechanism 18 is adapted to handle very thin packages because the article sweeping portion of the pusher blade path 40 lies very close to the conveyor belt 12. The preferred maximum length of the parcel is indicated by the space X between the confronting edges of the spring arms 106 and 108 so as to prevent interference with free motion of the arms. It is also possible to handle maximum height parcels much longer than the overall length of the pusher blade, in which case the radius arms 86 and the resilient arms 106 and 108 will initially push the parcel. The width and cross-sectional shape of a parcel must be such that the parcel is within the path 40 of the lower edge of the pusher blade 38, as illustrated in FIG. 3.

When a selected parcel 14 arrives opposite the discharge chute into which it is to be diverted, the motor M of the associated parcel diverter 18 is energized by whatever control means are employed as above noted. Accordingly the driveshaft 76 begins its 360 degrees of rotation from the position illustrated in FIGURE 5, and the pusher blade contacts the parcel when the crank levers 82 move perhaps 135 or more degrees, according to the width of the parcel. Meanwhile the cam rollers 94 approach and ride along the linear portions of the camming strips 96 so as to guide the blade 38 closely adjacent to and across the conveyor belt 12. The parcel is thus rapidly swept from the conveyor belt 12 into the adjacent discharge chute 20.

When the pusher blade 38 contacts the parcel, the spring arms 106 and 108 flex and absorb part of the impact force of the blade against the parcel, and continue to remain flexed as the pusher blade approaches its zone of maximum acceleration at 180 degrees. At the same time, it is to be particularly noted that the fulcrum point of the pusher blade 38 (the axis of the pivot shaft 44) has not changed, and the same condition obtains for the full orbit of the pusher blade. The result of the foregoing is that since the fulcrum point is fixed and is at maximum distance from the pusher blade, the requisite height of the article diverter mechanism 18 for handling a given size parcel at a given velocity is less than is required in other devices presently in use wherein the fulcrum point is not fixed, but moves vertically during a parcel diverting operation. Another disadvantage of the ordinary diverter is that, under the same conditions outlined above, it requires a more extended sweep path at the sides of the parcel conveyor belt than the present mechanism. Further, if the ordinary parcel diverter, having a movable fulcrum point, is made to operate at the same velocity but is reduced in size, the maximum parcel size that can be handled will necessarily be much smaller.

It will be apparent from the foregoing description that the utility of this invention is not limited to handling parcels or other rectangular, random-size articles, but can be advantageously employed, for example, as a reject mechanism for diverting articles of any shape from or onto an input conveyor feeding a processing machine. As a further example, the article diverting mechanism 18 might also be useful as a loading apparatus operating adjacent stop means against which a series of abutting articles are assembled, the diverting mechanism then transferring the assembled charge of articles into a case, a processing machine, or the like.

Although a particular embodiment of the present invention has been shown and described, it will be apparent that the parcel diverting apparatus 18 is capable of modification and variation without departing from the principles of the invention, and that the scope of the invention should be limited only by the scope and proper interpretation of the claims appended hereto.

The invention having thus been described, that which is believed to be new, and for which protection by Letters Patent is desired, is:

1. In an article handling apparatus for sweeping an article along a generally horizontal surface on which the article is supported, a frame, a pivot shaft mounted on said frame in a plane substantially parallel to and spaced above the article support surface, a carriage, an article pusher blade carried by said carriage, means guiding said carriage on said pivot shaft for swinging movement of said blade toward and away from said surface so as to push an article on the surface and for simultaneous movement of said blade toward and away from said surface in a path substantially radially related to said pivot shaft, and crank means connected to said carriage and mounted in said frame for rotary movement about an axis between said pivot shaft and said article support surface whereby the pusher blade is power driven toward and away from said pivot shaft and in an orbit successively downward toward the support surface, across the support surface, and then upward to its point of beginning.

2. In an apparatus for moving an article on a surface with which the article is in engagement, a support, a pusher member, a telescopic linkage having elongated first and second portions longitudinally movable relative to each other, said first portion being pivoted in said support on an axis that is in spaced parallel relation to said surface, said second portion being connected to said pusher member so that said pusher member is mounted for swinging movement across said surface about said axis and for movement lengthwise of said linkage toward and away from said axis, and powered means connected to said second portion of the linkage for effecting telescopic movement of said second linkage portion relative to said first linkage portion and moving said pusher member in an orbital path whereby said swinging and lengthwise movements of said pusher member accommodate movement of the pusher member in said orbital path.

3. The apparatus of claim 2 wherein said first portion of the linkage includes a guide track, and wherein said linkage includes means mounting said pusher member on said second portion for pivotal movement about a second axis substantially parallel to the pivot axis of said first portion and for movement toward and away from said second portion, said mounting means including a cam roller capable of being aligned with said guide track, resilient means interconnecting said second portion of the linkage and said pusher member for yieldably maintaining said roller in alignment with said track so that during movement of said pusher member in its orbital path, said roller moves along said track, and wherein a camming strip is mounted on said support in the path of travel of said roller for engagement thereby to limit movement of said pusher member toward said surface.

4. The apparatus of claim 2 wherein said pusher member is pivotally connected to said second portion for movement about a pivot axis in spaced parallel relation to the pivot axis of said first portion, and including resilient means engaging said pusher member and said second portion for yieldably maintaining said pusher member in substantially the same plane as said telescopic linkage.

5. In an article handling apparatus for sweeping an article along a generally horizontal surface on which the article is supported while minimizing impact with the article, a frame, a pivot shaft mounted on said frame in a plane substantially parallel to and in fixed spaced relation above the article support surface, a carriage, an article pusher blade carried by said carriage, guide means mounting said carriage on said pivot shaft for swinging movement of said blade about said pivot shaft and for movement of said carriage and blade in a path substantially radially related to said pivot shaft, means connected to said carriage and mounted in said frame for moving said pusher blade in an orbit successively downward toward the support surface, across the support surface, upward to its point of beginning, and means for maintaining said blade against an article which it engages as it moves across said surface.

6. In an article handling mechanism for pushing articles laterally from a substantially horizontal article conveying surface, the combination comprising a power driven crank lever mounted for rotation in a plane parallel to the desired direction of article movement; a crank pin carried by the free end of said crank lever; a radius arm having an upper bearing portion embracing said crank pin; a pivot shaft mounted at a fixed elevation above the upper limit of the throw of said crank lever; suspension means including an upper guide track portion mounted on said pivot shaft and a lower carriage portion slidable along said guide track portion, said carriage portion being pivotally connected to said crank pin for swinging movement of the carriage portion in the direction of article deflection and for up and down sliding movement of said carriage portion relative to said guide track portion; a pusher blade secured to the lower end of said radius arm; and an elongate arm fixed to said carriage portion for conjoint swinging movement therewith and having a lower end portion embraced by said pusher blade.

7. In an article handling mechanism for diverting articles laterally from a conveying surface, a power driven crank lever mounted for rotation in a plane parallel to the desired direction of article movement, a crank pin carried by the free end of said crank lever, a radius arm having an upper bearing portion embracing said crank pin, a pivot shaft mounted at a fixed elevation above the upper limit of the throw of said crank lever, suspension means including an upper end guide track portion mounted on said pivot shaft and a lower end carriage portion slidable relative to said upper guide track portion in a radial direction from said pivot shaft toward and away from said conveying surface, said lower end portion of the carriage portion being pivotally connected to said crank pin for swinging movement of the suspension means across said surface and up and down sliding movement of said carriage portion relative to said upper end guide track portion, and a pusher blade mounted on said radius arm.

8. In an article handling mechanism including a conveyor, an apparatus for diverting articles on said conveyor comprising a frame mounted over said conveyor, a guide track having an upper end pivotally connected to said frame above said conveyor for swinging movement transversely of said conveyor, a carriage slidably engaged with said guide track for sliding movement in said guide track toward and away from said conveyor, said carriage having a lower portion, a crank lever having a free end, a drive-shaft connected to said crank lever for rotating the crank lever in a selected direction for one revolution, a crank pin interconnecting the free end of said crank lever and the lower portion of said carriage so that rotary movement of the crank imparts simultaneous swinging movement and sliding movement to the carriage a depending radius arm pivoted to the lower portion of said carriage and having a lower end a pusher blade connected to the lower end of said radius arm and having its major axis normal to the direction of swinging movement of said guide track and said carriage, and an elongate resiliently flexible arm having an upper portion connected to said carriage an intermediate portion secured to said crank pin and a lower end portion engaged with said pusher blade for enabling resiliently yieldable movement of the blade rearwardly of the direction of swinging movement of the blade upon impact with an article.

9. In an article handling mechanism for pushing articles laterally from an article conveying surface and including a drive element mounted for travel in an orbital path the combination of a pivot shaft mounted at a fixed elevation above the upper limit of movement of said drive element; suspension means including an upper guide track portion mounted on said pivot shaft and a lower carriage portion slidable along said guide track portion said carriage portion being pivotally connected to said drive element for swinging movement of the carriage portion across said surface and for sliding movement of said carriage portion toward and away from said pivot shaft and relative to said guide track portion; a pusher blade; means mounting the pusher blade on said drive element; and elongated arm fixed to said carriage portion for conjoint swinging movement therewith and having a lower end portion engaging said pusher blade.

10. The mechanism of claim 9 wherein said elongated arm is resiliently flexible.

11. In an apparatus for moving an article on a surface elongated guide means mounted for swinging movement on an axis in fixed spaced substantially parallel relation to said surface and projecting toward said surface, a carriage engaged with said guide means and being mounted thereby for swinging movement with the guide means about said axis and for movement lengthwise of said guide means toward and away from said axis, means including a power driven shaft and a bell crank secured to said shaft and pivotally connected to said carriage for moving said carriage in an orbital path across said surface and for moving said carriage relative to said guide means toward and away from said axis, a pusher member, and means mounting said pusher member on said carriage for pushing engagement with an article on the surface during the orbital travel of the carriage.

12. The apparatus of claim 1 wherein said guide means includes a channel, wherein said pusher member is mounted on said carriage for movement relative thereto, wherein a cam is mounted in spaced relation to said surface, and wherein said apparatus includes a cam follower and means attaching said follower to said pusher so that said follower engages said cam to move said pusher member toward said carriage as the pusher member moves across and closely adjacent to said surface and so that said follower moves within said channel when said pusher member is moving in a portion of its orbital path which is spaced from said surface.

References Cited by the Examiner

UNITED STATES PATENTS 3,033,366   5/1962   Atanasoff et al. _____ 209—82
3,043,429   7/1962   Osmanski _____ 198—185 X SAMUEL F. COLEMAN, *Primary Examiner.*

WILLIAM B. LABORDE, *Examiner.*